US009549416B2

(12) United States Patent
She et al.

(10) Patent No.: US 9,549,416 B2
(45) Date of Patent: Jan. 17, 2017

(54) METHOD OF DETERMINING POSITION OF ACKNOWLEDGEMENT INFORMATION FOR HARQ IN PUCCH

(71) Applicant: Alcatel Lucent, Boulogne Billancourt (FR)

(72) Inventors: Feng She, Shanghai (CN); Yun Deng, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/440,711

(22) PCT Filed: Oct. 14, 2013

(86) PCT No.: PCT/IB2013/002464
§ 371 (c)(1),
(2) Date: May 5, 2015

(87) PCT Pub. No.: WO2014/068394
PCT Pub. Date: May 8, 2014

(65) Prior Publication Data
US 2015/0271839 A1 Sep. 24, 2015

(30) Foreign Application Priority Data
Nov. 5, 2012 (CN) .......................... 2012 1 0437186

(51) Int. Cl.
*H04W 4/00* (2009.01)
*H04W 72/12* (2009.01)
*H04L 1/18* (2006.01)
*H04L 5/00* (2006.01)
*H04W 72/04* (2009.01)

(52) U.S. Cl.
CPC ........ *H04W 72/1263* (2013.01); *H04L 1/1829* (2013.01); *H04L 1/1864* (2013.01);
(Continued)

(58) Field of Classification Search
None
See application file for complete search history.

(56) References Cited

U.S. PATENT DOCUMENTS

| 8,861,450 B2 * | 10/2014 | Kim ..................... H04W 72/042 370/329 |
| 2011/0310784 A1 * | 12/2011 | Park ...................... H04L 1/1854 370/312 |
| 2013/0121304 A1 * | 5/2013 | Nory ..................... H04L 1/1861 370/330 |

OTHER PUBLICATIONS

"LTE; Evolved Universal Terrestrial Radio Access (E-UTRA); Physical layer procedures," 3GPP TS 36.213 version 11.0.0 Release 11, ETSI TS 136 213 V11.0.0, Oct. 2012, 145 pages.
(Continued)

*Primary Examiner* — Minh-Trang Nguyen
(74) *Attorney, Agent, or Firm* — Fay Sharpe, LLP

(57) ABSTRACT

The invention relates to a method, in a wireless communication System, of determining the position, of acknowledgment/non-acknowledgment information for a hybrid automatic repeat request, in a physical uplink control channel, wherein the user equipment sends in an uplink sub-frame the acknowledgment/non-acknowledgment information for one or more downlink sub-frames. In an aspect of the invention, the base station sends to the user equipment a first starting position related to each ePDCCH set, a first offset related to a mapping relationship between the uplink sub-frame and information about the number of enhanced control channel éléments per ePDCCH set. The user equipment détermines the position, of the acknowledgment/non-acknowledgment information for the hybrid automatic repeat request, in the physical uplink control channel upon réception of the foregoing information. With the inventive solution, a waste of
(Continued)

physical uplink control channel resources can be lowered and full use of the resources can be made to thereby improve the efficiency of the System.

13 Claims, 4 Drawing Sheets

(52) U.S. Cl.
CPC .......... *H04L 1/1896* (2013.01); *H04L 5/0055* (2013.01); *H04L 5/0094* (2013.01); *H04W 72/0406* (2013.01)

(56) References Cited

OTHER PUBLICATIONS

Alcatel-Lucent Shanghai Bell et al., "Remaining details of PUCCH Resource allocation for EPDCCH," 3$^{rd}$ Generation Partnership Project (3GPP), 3GPP TSG RAN WG1 Meeting #71, R1-124875, pp. 1-3, XP050662838, New Orleans, USA, Nov. 12-16, 2012.

Ericsson et al., "Remaining details of PUCCH resource allocation for EPDCCH," 3$^{rd}$ Generation Partnership Project (3GPP), 3GPP TSG-RAN WG1 #71, R1-124896, pp. 1-4, XP050662654, Nov. 12-16, 2012.

Samsung, "PUCCH Format 1a/1b Resources in Response to ePDCCH Detections," 3$^{rd}$ Generation Partnership Project (3GPP), 3GPP TSG RAN WG1 #70, R1-123491, pp. 1-3, XP050661370, Qingdao, China, Aug. 13-17, 2012.

Sharp et al., "WF on PUCCH Format 1a/1b resource allocation for ePDCCH based HARQ-ACKs Sharp, Nokia Siemens Networks, Nokia, Samsung, Docomo," 3$^{rd}$ Generation Partnership Project (3GPP), 3GPP TSG RAN WG1 Meeting #70, R1-123975, pp. 1-5, XP050661822, Qingdao, China, Aug. 13-17, 2012.

International Search Report for PCT/IB2013/002464 dated Apr. 9, 2014.

* cited by examiner

US 9,549,416 B2

METHOD OF DETERMINING POSITION OF ACKNOWLEDGEMENT INFORMATION FOR HARQ IN PUCCH

FIELD OF THE INVENTION

The present disclosure relates to a wireless communication system and particularly to a method of determining a position, of acknowledgment information for a hybrid automatic repeat request, in a physical uplink control channel.

BACKGROUND OF THE INVENTION

In the prior art, the introduction of an enhanced Physical Downlink Control Channel (ePDCCH) enables a system to schedule a larger number of users. If a user equipment supports its scheduling by a base station over ePDCCHs, then the base station configures via Radio Resource Control (RRC) signaling the user equipment with parameters for scheduling over the ePDCCHs, for example, an ePDCCH set to be detected by the user equipment. The base station can configure the user equipment with one or two ePDCCH sets, and the base station needs to configure the number and the positions of physical resource blocks included per ePDCCH set; and the base station can further configure the serial number of a starting symbol per ePDCCH, a sub-frame of the ePDCCH to be detected by the user equipment, etc. Upon reception of the RRC signaling and obtaining the ePDCCH-related parameters, the UE listens to the ePDCCH and decodes its own Downlink Control Information (DCI) according to its own radio network temporary identifier.

However such a problem may arise that Physical Uplink Control Channel (PUCCH) resources in the uplink over which Acknowledgment/Non-Acknowledgment (ACK/NACK) messages for Hybrid Automatic Repeat Requests (HARQs) are sent may become insufficient along with an increasing number of scheduled users.

At present some technologies have been used to alleviate the insufficiency of PUCCH resources, for example, a lowest enhanced Control Channel Element index plus an offset has been introduced in a frequency division multiplexed system, etc. Unlike the frequency division multiplex system, there are in a time division multiplexed system both a case that one uplink sub-frame corresponds to one downlink sub-frame and a case that one uplink sub-frame corresponds to more than one downlink sub-frame (that is, ACK/NACK feedback information of a plurality of downlink data sub-frames needs to be sent in one uplink sub-frame). For example, as illustrated in FIG. 1, an uplink sub-frame in a circle corresponds to two downlink sub-frames, an uplink sub-frame to the left of the uplink sub-frame in the circle corresponds to three downlink sub-frames, and an uplink sub-frame to the right of the uplink sub-frame in the circle corresponds to one downlink sub-frame. Thus signaling for this characteristic of uplink and downlink mapping in the time division multiplexed system has to be introduced to allocate PUCCH resources. The PUCCH resources have to be allocated while avoiding both collision and a waste of resources from occurring.

In the prior art, a large offset has to be considered for a plurality of coexisting one-to-many configurations of uplink and downlink sub-frames, thus incurring a waste of resources.

SUMMARY OF THE INVENTION

In view of the foregoing, it will be very beneficial if a resource allocating method which can make full use of uplink control channel resources in an uplink sub-frame.

According to a first aspect of the invention, there is proposed a method, in a base station of a wireless communication system, of assisting a user equipment in determining a position, of acknowledgment/non-acknowledgment information for a hybrid automatic repeat request, in a physical uplink control channel, wherein the user equipment sends in an uplink sub-frame the acknowledgment/non-acknowledgment information for one or more downlink sub-frames, and the method includes the steps of: determining a mapping relationship between the uplink sub-frame and the downlink sub-frame or sub-frames and the number of enhanced control channel elements ($N_{eCCE}^{k}$) per ePDCCH set; determining a first starting position ($N_{UE-PUCCH}^{(k)}$) related to each ePDCCH set; determining a first offset ($\Delta_i$) related to the determined mapping relationship between the uplink sub-frame and the downlink sub-frame or sub-frames; and sending the determined first starting position ($N_{UE-PUCCH}^{(k)}$) and first offset ($\Delta_i$) and information about the number of enhanced control channel elements ($N_{eCCE}^{k}$) per ePDCCH set to the user equipment.

According to a second aspect of the invention, there is proposed a method, in a user equipment of a wireless communication system, of determining a position, of acknowledgment/non-acknowledgment information for a hybrid automatic repeat request, in a physical uplink control channel, wherein the user equipment sends in an uplink sub-frame the acknowledgment/non-acknowledgment information for one or more downlink sub-frames, and the method includes the steps of: receiving from a base station a first starting position ($N_{UE-PUCCH}^{(k)}$) related to each ePDCCH set, a first offset ($\Delta_i$) related to a mapping relationship between the uplink sub-frame and the downlink sub-frame or sub-frames and information about the number of enhanced control channel elements ($N_{eCCE}^{k}$, $1 \le k \le L$) per ePDCCH set; determining a serial number (in) of a downlink sub-frame including downlink control information related to the user equipment; determining a lowest index ($n_{eCCE,m,k}$) of an enhanced control channel element occupied, by the downlink control information related to the user equipment, in an ePDCCH set, including the downlink control information related to the user equipment, in the downlink sub-frame; and determining the position, of the acknowledgment/non-acknowledgment information for the hybrid automatic repeat request, in the physical uplink control channel as: $n_{eCCE,m,k}^{1} = m \times N_{eCCE}^{k} + n_{eCCE,m,k} + N_{UE-PUCCH}^{(k)} + \Delta_i$, wherein m is the serial number of the downlink sub-frame including the downlink control information related to the user equipment, $N_{eCCE}^{k}$ is the number of enhanced control channel elements in the k-th ePDCCH set with $1 \le k \le L$ and L being the number of ePDCCH sets per downlink sub-frame, $N_{UE-PUCCH}^{(k)}$ is the first starting position from the base station, $\Delta_i$ is the first offset from the base station, and $n_{eCCE,m,k}$ is the lowest index of the enhanced control channel element occupied, by the downlink control information related to the user equipment, in the k-th ePDCCH set, including the downlink control information related to the user equipment, in the m-th downlink sub-frame.

As compared with the prior art, an advantage of the inventive solution lies in that the base station can set an offset according to an uplink and downlink configuration in a time division multiplexed system and according to the mapping relationship between the uplink sub-frame and the downlink sub-frame or sub-frames and send appropriate signaling to the user equipment to notify the user equipment of corresponding offset information, so that the user equipment can obtain the position of an allocated uplink control channel resource, thereby releasing a larger number of PUCCH resources.

According to a third aspect of the invention, there is proposed a method, in a base station of a wireless communication system, of assisting a user equipment in determining a position, of acknowledgment/non-acknowledgment information for a hybrid automatic repeat request, in a physical uplink control channel, wherein the user equipment sends in an uplink sub-frame the acknowledgment/non-acknowledgment information for one or more downlink sub-frames, and the method includes the steps of: determining the number of ePDCCH sets (L) per downlink sub-frame, the number of physical resource block pairs per ePDCCH set ($N_l$, $1 \le l \le L$), the number of enhanced control channel elements ($N_{eCCE}$) per physical resource block pair, and an aggregation level ($Q_l$) of downlink control information for scheduling the user equipment per ePDCCH set; determining a second starting position ($N_{UE\text{-}PUCCH}^{(k)}$) related to each ePDCCH set; and sending to the user equipment the determined second starting position ($N_{UE\text{-}PUCCH}^{(k)}$), the determined number (L) of ePDCCH sets per downlink sub-frame, the number of physical resource block pairs ($N_l$, $1 \le l \le L$) per ePDCCH set, the number of enhanced control channel elements ($N_{eCCE}$) per physical resource block pair, and the aggregation level ($Q_l$) of the downlink control information for scheduling the user equipment per ePDCCH set.

According to a fourth aspect of the invention, there is proposed a method, in a user equipment of a wireless communication system, of determining a position, of acknowledgment/non-acknowledgment information for a hybrid automatic repeat request, in a physical uplink control channel, wherein the user equipment sends in an uplink sub-frame the acknowledgment/non-acknowledgment information for one or more downlink sub-frames, and the method includes the steps of: receiving from a base station a second starting position ($N_{UE\text{-}PUCCH}^{(k)}$) related to each ePDCCH set, the number of ePDCCH sets (L) per downlink sub-frame, the number of physical resource block pairs ($N_l$, $1 \le l \le L$) per ePDCCH set, the number of enhanced control channel elements ($N_{eCCE}$) per physical resource block pair, and an aggregation level ($Q_l$) of downlink control information for scheduling the user equipment per ePDCCH set; calculating a second offset related to all the ePDCCH sets in a downlink sub-frame in the equation of $$\Delta = \sum_{l=1}^{L} \left\lfloor \frac{N_l \times N_{eCCE}}{Q_l} \right\rfloor,$$

wherein L is the number of ePDCCH sets per downlink sub-frame, $N_l$ is the number of physical resource block pairs in the l-th ePDCCH set with $1 \le l \le L$, $N_{eCCE}$ is the number of enhanced control channel elements per physical resource block pair, and $Q_l$ is the aggregation level of the downlink control information for scheduling the user equipment in the l-th ePDCCH set; determining a serial number (in) of a downlink sub-frame including the downlink control information related to the user equipment; determining a lowest index ($n_{eCCE,m,k}$) of an enhanced control channel element occupied, by the downlink control information related to the user equipment, in an ePDCCH set, including the downlink control information related to the user equipment, in the downlink sub-frame; and determining the position, of the acknowledgment/non-acknowledgment information for the hybrid automatic repeat request, in the physical uplink control channel as: $n_{PUCCH,m,k}^{1} = \Delta \times m + n_{eCCE,m,k} + N_{UE\text{-}PUCCH}^{(k)}$, wherein m is the serial number of the downlink sub-frame including the downlink control information related to the user equipment, $N_{UE\text{-}PUCCH}^{(k)}$ is the second starting position from the base station, $\Delta$ is the calculated second offset, and $n_{eCCE,m,k}$ is the lowest index of the enhanced control channel element occupied, by the downlink control information related to the user equipment, in the k-th ePDCCH set, including the downlink control information related to the user equipment, in the m-th downlink sub-frame.

With this solution of the invention, the base station provides the user equipment with the number of ePDCCH sets for scheduling in the sub-frame and the number of enhanced control channel elements per ePDCCH, so that the user equipment calculates a new offset and further obtains the position of a physical uplink control channel resource, thereby lowering a waste of resources.

According to a fifth aspect of the invention, there is proposed a method, in a base station of a wireless communication system, of assisting a user equipment in determining a position, of acknowledgment/non-acknowledgment information for a hybrid automatic repeat request, in a physical uplink control channel, wherein the user equipment sends in an uplink sub-frame the acknowledgment/non-acknowledgment information for one or more downlink sub-frames, and the method includes the steps of: determining the number of ePDCCH sets (L) per downlink sub-frame, the number of physical resource block pairs per ePDCCH set ($N_l$, $1 \le l \le L$), the number of enhanced control channel elements ($N_{eCCE}$) per physical resource block pair, and an aggregation level ($Q_l$) of downlink control information for scheduling the user equipment per ePDCCH set; determining a second starting position ($N_{UE\text{-}PUCCH}^{(k)}$) related to each ePDCCH set; determining a second offset ($\Delta$) related to all the ePDCCH sets in a downlink sub-frame:

$$\Delta = \sum_{l=1}^{L} \left\lfloor \frac{N_l \times N_{eCCE}}{Q_l} \right\rfloor,$$

wherein L is the number of ePDCCH sets per downlink sub-frame, $N_1$ is the number of physical resource block pairs in the l-th ePDCCH set with $1 \le l \le L$, $N_{eCCE}$ is the number of enhanced control channel elements per physical resource block pair, and $Q_l$ is the aggregation level of the downlink control information for scheduling the user equipment related to the l-th ePDCCH set; and sending the determined second starting position ($N_{UE\text{-}PUCCH}^{(k)}$) and second offset ($\Delta$) to the user equipment.

According to a sixth aspect of the invention, there is proposed a method, in a user equipment of a wireless communication system, of determining a position, of acknowledgment/non-acknowledgment information for a hybrid automatic repeat request, in a physical uplink control channel, wherein the user equipment sends in an uplink sub-frame the acknowledgment/non-acknowledgment information for one or more downlink sub-frames, and the method includes the steps of: receiving a second starting position ($N_{UE\text{-}PUCCH}^{(k)}$) related to each ePDCCH set and a second offset ($\Delta$) related to all the ePDCCH sets in a downlink sub-frame from a base station, wherein the second offset ($\Delta$) is determined in the equation of:

$$\Delta = \sum_{l=1}^{L} \left\lfloor \frac{N_l \times N_{eCCE}}{Q_l} \right\rfloor,$$

wherein L is the number of ePDCCH sets per downlink sub-frame, $N_l$ is the number of physical resource block pairs in the l-th ePDCCH set with $1 \leq l \leq L$, $N_{eCCE}$ is the number of enhanced control channel elements per physical resource block pair, and $Q_l$ is an aggregation level of downlink control information for scheduling the user equipment in the l-th ePDCCH set; determining a serial number (m) of a downlink sub-frame including the downlink control information related to the user equipment; determining a lowest index ($n_{eCCE,m,k}$) of an enhanced control channel element occupied, by the downlink control information related to the user equipment, in an ePDCCH set, including the downlink control information related to the user equipment, in the downlink sub-frame; and determining the position, of the acknowledgment/non-acknowledgment information for the hybrid automatic repeat request, in the physical uplink control channel as: $n_{PUCCH,m,k}^1 = \Delta \times m + n_{eCCE,m,k} + N_{UE-PUCCH}^{(k)}$, wherein m is the serial number of the downlink sub-frame including the downlink control information related to the user equipment, $N_{UE-PUCCH}^{(k)}$ is the second starting position from the base station, $\Delta$ is the second offset from the base station, and $n_{eCCE,m,k}$ is the lowest index of the enhanced control channel element occupied, by the downlink control information related to the user equipment, in the k-th ePDCCH set, including the downlink control information related to the user equipment, in the m-th downlink sub-frame.

With the solution of this embodiment, the second offset can be calculated by the base station with strong calculation power to thereby lower a calculation overhead at the user equipment side.

According to a seventh aspect of the invention, there is proposed a method, in a base station of a wireless communication system, of assisting a user equipment in determining a position, of acknowledgment/non-acknowledgment information for a hybrid automatic repeat request, in a physical uplink control channel, wherein the user equipment sends in an uplink sub-frame the acknowledgment/non-acknowledgment information for one or more downlink sub-frames, and the method includes the steps of: determining a third starting position ($N_{UE-PUCCH}^{(k)}$) related to each ePDCCH set; determining a third offset (off) dynamically according to a condition of scheduling, by the base station, of one or more user equipments in a plurality of downlink sub-frames; and sending the third starting position ($N_{UE-PUCCH}^{(k)}$) and information indicating the third offset (off) to the user equipment, wherein the third starting position ($N_{UE-PUCCH}^{(k)}$) is sent in radio resource control information, and the information indicating the third offset (off) is sent in downlink control information.

According to an eighth aspect of the invention, there is proposed a method, in a user equipment of a wireless communication system, of determining a position, of acknowledgment/non-acknowledgment information for a hybrid automatic repeat request, in a physical uplink control channel, wherein the user equipment sends in an uplink sub-frame the acknowledgment/non-acknowledgment information for one or more downlink sub-frames, and the method includes the steps of: receiving from a base station a third starting position ($N_{UE-PUCCH}^{(k)}$), related to each ePDCCH set, included in radio resource control information; and receiving from the base station information, indicating a third offset (off), included in downlink control information in an ePDCCH set of a downlink sub-frame, wherein the third offset (off) is an offset determined dynamically by the base station for the user equipment according to a condition of scheduling of one or more user equipments in a plurality of downlink sub-frames; determining a lowest index ($n_{eCCE,k}$) (of an enhanced control channel element, related to the downlink control information of the user equipment, in the ePDCCH set including the information indicating the third offset (off); and determining the position, of the acknowledgment/non-acknowledgment information for the hybrid automatic repeat request, in the physical uplink control channel as: $n_{PUCCH,k}^1 = n_{eCCE,k} + N_{UE-PUCCH}^{(k)} + off$, wherein $n_{eCCE,k}$ is the lowest index of the enhanced control channel element, related to the downlink control information of the user equipment, in the k-th ePDCCH set, $N_{UE-PUCCH}^{(k)}$ is the third starting position from the base station, and off is the third offset.

With this solution of the invention, for the case that the base station schedules the same user equipment in a plurality of downlink sub-frames and the user equipment acknowledges the plurality of downlink sub-frames in one uplink sub-frame, the base station can determine dynamically an offset for the user equipment according to a condition of scheduling of one or more user equipments in the plurality of downlink sub-frames to thereby lower a possible waste of resources.

According to a ninth aspect of the invention, there is proposed a method, in a base station of a wireless communication system, of assisting a user equipment in determining a position, of acknowledgment/non-acknowledgment information for a hybrid automatic repeat request, in a physical uplink control channel, wherein the user equipment sends in an uplink sub-frame the acknowledgment/non-acknowledgment information for one or more downlink sub-frames, and the method includes the steps of: determining a fourth starting position ($N_{UE-PUCCH}^{(m,k)}$) related to each ePDCCH set per sub-frame; and sending the determined fourth starting position ($N_{UE-PUCCH}^{(m,k)}$) to the user equipment.

According to a tenth aspect of the invention, there is proposed a method, in a user equipment of a wireless communication system, of determining a position, of acknowledgment/non-acknowledgment information for a hybrid automatic repeat request, in a physical uplink control channel, wherein the user equipment sends in an uplink sub-frame the acknowledgment/non-acknowledgment information for one or more downlink sub-frames, and the method includes the steps of: receiving from a base station a fourth starting position ($N_{UE-PUCCH}^{(m,k)}$) related to each ePDCCH set per sub-frame; determining a serial number (in) of a downlink sub-frame including downlink control information related to the user equipment; determining a lowest index ($n_{eCCE,m,k}$) of an enhanced control channel element, occupied by the downlink control information related to the user equipment, in an ePDCCH set, including the downlink control information related to the user equipment, in the downlink sub-frame; and determining the position, of the acknowledgment/non-acknowledgment information for the hybrid automatic repeat request, in the physical uplink control channel as: $n_{PUCCH,m,k}^1 = n_{eCCE,m,k} + N_{UE-PUCCH}^{(m,k)}$, wherein m is the serial number of the downlink sub-frame including the downlink control information related to the user equipment, $n_{eCCE,m,k}$ is the lowest index of the enhanced control channel element occupied, by the downlink control information related to the user equipment, in the k-th ePDCCH set, including the downlink control information related to the user equipment, in the m-th downlink sub-frame, and $N_{UE-PUCCH}^{(m,k)}$ is the fourth starting position from the base station.

As opposed to the other embodiments of the invention, with the solution of this embodiment, the starting position per subset per sub-frame can be calculated by the base station with strong calculation power to thereby lower a calculation overhead at the user equipment side.

The respective aspects of the invention will become more apparent from the following description of particular embodiments.

BRIEF DESCRIPTION OF DRAWINGS

Other features, objects and advantages of the invention will become more apparent upon review of the following detailed description of non-limiting embodiments take with reference to the drawings in which.

DETAILED DESCRIPTION OF EMBODIMENTS

In the following detailed description of preferred embodiments, reference will be made to the drawings which constitute a part of the invention. By way of examples, the drawings illustrate particular embodiments in which the invention can be practiced. The illustrated embodiments are not intended to exhaust all of embodiments of the invention. It can be appreciated that other embodiments can be utilized instead thereof or structural and logic modifications can be made thereto without departing from the scope of the invention. Accordingly the following detailed description will not be limiting, and the scope of the invention will be defined in the appended claims.

In the LTE, an HARQ mechanism is adopted, a "stop and wait" mechanism is adopted in a single HARQ process, and a transmission process of a downlink data packet includes transmission of downlink data, an uplink ACK feedback and possible retransmission. The downlink data is transmitted over a Physical Downlink Shared Channel (PDSCH), and a base station indicates via DCI in a sub-frame n to a user equipment a PDSCH resource occupied for transmission of the data to instruct the user equipment to receive the data over the specified PDSCH resource. If the user equipment can receive the data correctly, then the user equipment needs to feed ACK back to the base station over a PUCCH in a sub-frame n+k; otherwise, the user equipment needs to feed NACK back to the base station over the PUCCH in the sub-frame n+k, where k=4 in a frequency division multiplexed system, and k>=4 in a time division multiplexed system. Particularly in the time division multiplexed system, one uplink sub-frame needs to provide ACK/NACK feedback resources corresponding to a plurality of downlink data sub-frames for the scenario where the number of downlink sub-frames is larger than the number of uplink sub-frames (i.e., a non-one-to-one scenario). As ascertained in the existing protocol, a specific uplink sub-frame in a different configuration of the time division multiplexed system needs to give a feedback for a downlink data sub-frame or sub-frames, that is, the user equipment knows that in a specific uplink sub-frame there is a need of making a feedback for one or more downlink data sub-frames.

For the scenario where ACK/NACK information of a plurality of downlink data sub-frames is reported in one uplink sub-frame, each downlink sub-frame will be configured with a specific number of ePDCCH sets, and for a specific user equipment, the base station configures the user equipment with one or two ePDCCH sets; and the user equipment listens to the configured ePDCCH set or sets for its own downlink control information (the user equipment determines its own downlink control information by its own radio network temporary identifier).

Figure 2:
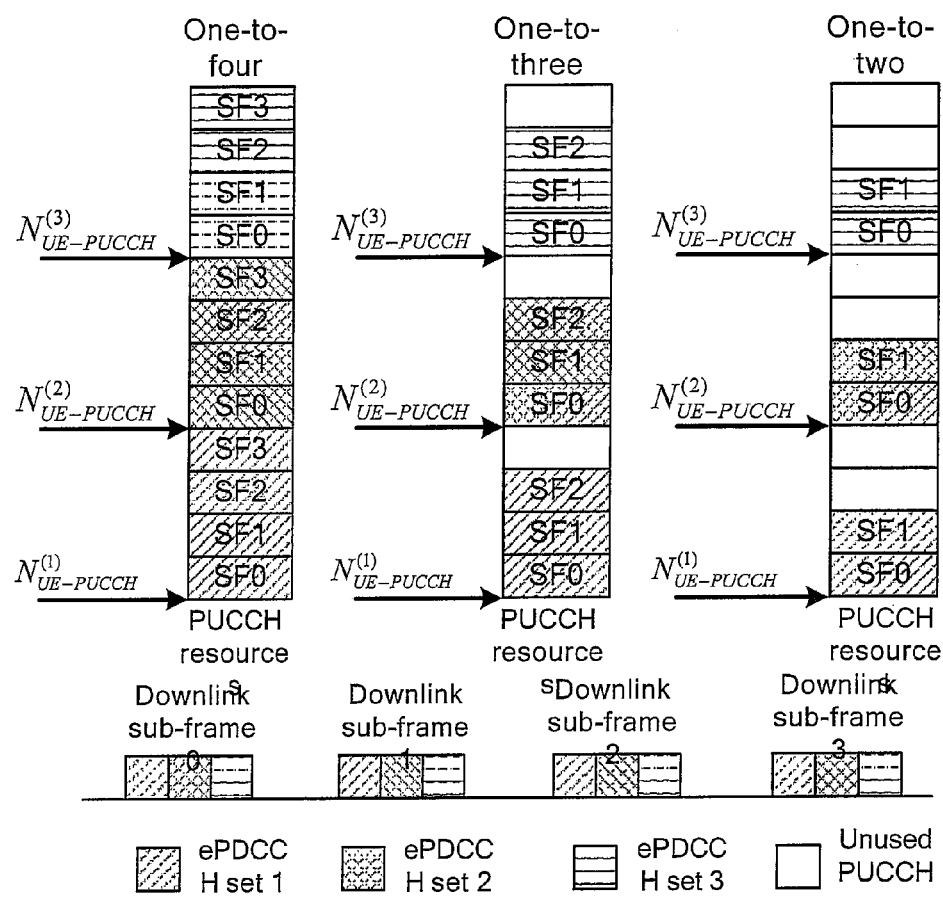
FIG. 2 illustrates a schematic diagram of allocation of physical uplink control channel resources in the prior art.

FIG. 2 illustrates a schematic diagram of allocation of physical uplink control channel resources in the prior art.

Figure 1:
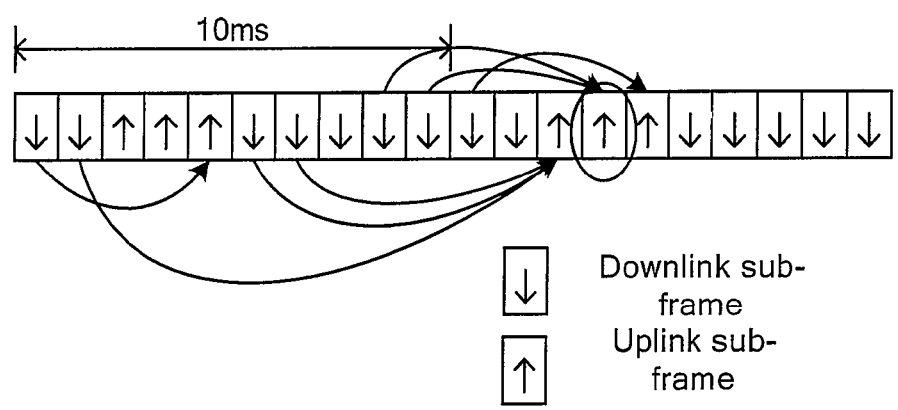
FIG. 1 illustrates a schematic diagram of correspondence of an uplink sub-frame to one or more downlink sub-frames.

In view of those cases concurrent in the prior art as illustrated in FIG. 1 that one, two, three or four downlink sub-frames are acknowledged in one uplink sub-frame, that is, ACK/NACK of one, two, three or four downlink sub-frames is reported in one uplink sub-frame, allocation of PUCCH resources needs to be designed by setting a starting position per ePDCCH set based upon the worst case as illustrated in FIG. 2. That is, a starting position needs to be set while ensuring four downlink sub-frames to be acknowledged in one uplink sub-frame, in other words, the reserved resources need to be sufficient to acknowledge four downlink sub-frames.

However such setting of a starting position may consequently waste the PUCCH resources in the cases that one, two or three downlink sub-frames are acknowledged in one uplink sub-frame. As illustrated in FIG. 2, some PUCCH resources will be unused in the one-to-two and one-to-three cases.

In view of this, the invention is intended to propose a resource allocating method which can lower a waste of physical uplink control channel resources and make full use of resources of an uplink sub-frame.

Figure 3:
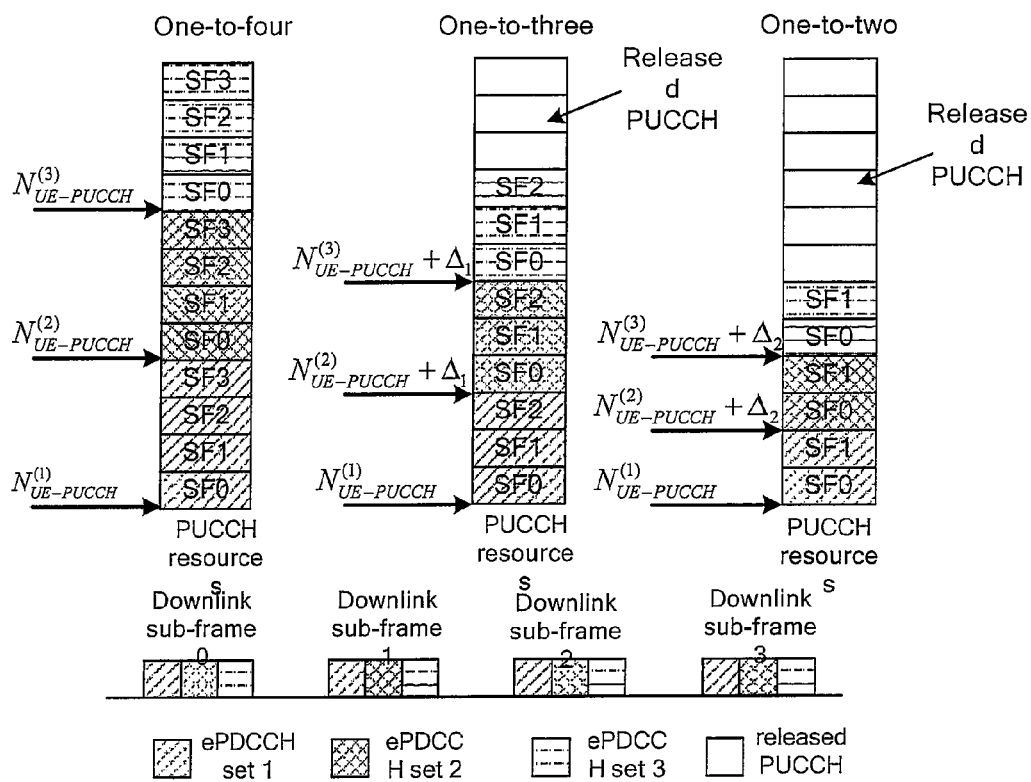
FIG. 3 illustrates a schematic diagram of allocation of physical uplink control channel resources according to an embodiment of the invention.

FIG. 3 illustrates a schematic diagram of allocation of physical uplink control channel resources according to an embodiment of the invention.

In the embodiment illustrated in FIG. 3, it is assumed that three ePDCCH sets are scheduled per downlink sub-frame, and each ePDCCH set is configured with a starting position $N_{UE-PUCCH}^{(k)}$ related to the ePDCCH set, where k=1, 2, 3 in this embodiment. In FIG. 3, it is assumed that there coexist numerous uplink/downlink sub-frame mapping scenarios, for example, scenarios of one uplink sub-frame to four downlink sub-frames, of one uplink sub-frame to three downlink sub-frames and of one uplink sub-frame to two downlink sub-frames coexist. For the different uplink/downlink sub-frame mapping scenarios, a first offset $\Delta_i$ related to an uplink/downlink sub-frame mapping relationship is introduced, where i represents the i-th uplink/downlink sub-frame mapping relationship. FIG. 3 illustrates three mapping relationships, that is, one-to-four, one-to-three and one-to-two.

Particularly in the embodiment illustrated in FIG. 3, a base station sends the following information to a user equipment: a first starting position $N_{UE-PUCCH}^{(k)}$ related to each ePDCCH set, a first offset $\Delta_i$ related to a mapping relationship between an uplink sub-frame and downlink sub-frames, and information about the number of enhanced control channel elements $N_{eCCE}^{k}$ per ePDCCH set, for example, $N_{eCCE}^{k}$ per se or the number of physical resource block pairs included per ePDCCH set, from which the use equipment calculates actual $N_{eCCE}^k$ as in the prior art.

Correspondingly the user equipment determines the position of a PUCCH resource in the uplink sub-frame based upon the information sent from the base station.

Particularly the user equipment determines the position, of ACK/NACK information for an HARQ, in a PUCCH as:

$$n_{PUCCH,m,k}^1 = m \times N_{eCCE}^k + n_{eCCE,m,k} + N_{UE-PUCCH}^{(k)} + \Delta_i,$$

Where in is the serial number of a downlink sub-frame including downlink control information related to the user equipment. As illustrated in FIG. 3, taking one-to-four as an example, the first downlink sub-frame is numbered 0, the second downlink sub-frame is numbered 1, the third downlink sub-frame is numbered 2, and the fourth downlink sub-frame is numbered 3. The downlink control information related to the user equipment refers to downlink control information determined by the user equipment as its own downlink control information by its own radio network temporary identifier.

$N_{eCCE}^k$ is the number of enhanced control channel elements in the k-th ePDCCH set with $1 \leq k \leq L$ and L being the number of ePDCCH sets per downlink sub-frame, $N_{UE-PUCCH}^{(k)}$ is the first starting position from the base station, $\Delta_i$ is the first offset from the base station, and $n_{eCCE,m,k}$ is the lowest index of an enhanced control channel element occupied, by the downlink control information related to the user equipment, in the k-th ePDCCH set, including the downlink control information related to the user equipment, in the downlink sub-frame numbered in.

Particularly for the scenario with one-to-one correspondence, $\Delta_i$ is 0; or $\Delta_i$ can also be 0 for another scenario without one-to-one correspondence, and at this time, a waste of PUCCH resources may arise, but this can also be adopted because only a low waste of resources arises from $\Delta_i$ being 0 if there is a small ePDCCH set. If $\Delta_i$ is 0, then the base station may not send this parameter to the user equipment.

In another embodiment of the invention, the base station can further determine an aggregation level $Q_l$ of the downlink control information for scheduling the user equipment per ePDCCH set and sends the aggregation level $Q_l$ to the user equipment.

Correspondingly the user equipment determines the position, of the ACK/NACK information for the HARQ, in the PUCCH according to the aggregation level $Q_l$.

Particularly the user equipment determines the position, of the ACK/NACK information for the HARQ, in the PUCCH as:

$$n_{PUCCH,m,k}^1 = m \times \frac{N_{eCCE}^k}{Q_l} + n_{eCCE,m,k} + N_{UE-PUCCH}^{(k)} + \Delta_i.$$

An existing PDCCH is organized at a granularity of a Control Channel Element (CCE). A CCE is composed of 9 Resource Element Groups (REGs). A REG is composed of 4 resource elements. Thus a CCE is composed of 36 resource elements. It is possible for a PDCCH resource occupied by a user equipment (Downlink Control Information DCI of the user equipment) to include 1, 2, 4 or 8 CCEs, which is referred to as an aggregation level.

An ePDCCH is structurally similar to the PDCCH, and the ePDCCH is organized at a granularity of an enhanced Control Channel Element (eCCE), each eCCE is composed of 4 or 8 eREGs, and DCI is composed of 1, 2, 4, 8 or 16 eCCEs, that is, an aggregation level of 1, 2, 4, 8 or 16.

As illustrated in FIG. 3, the inventive method can lower a waste of PUCCH resources. In contrast to the prior art illustrated in FIG. 2, the inventive method can release some of PUCCH resources, and this part of released resources can be used for transmission of other data or signaling, thereby improving the efficiency of a communication system.

Figure 4:
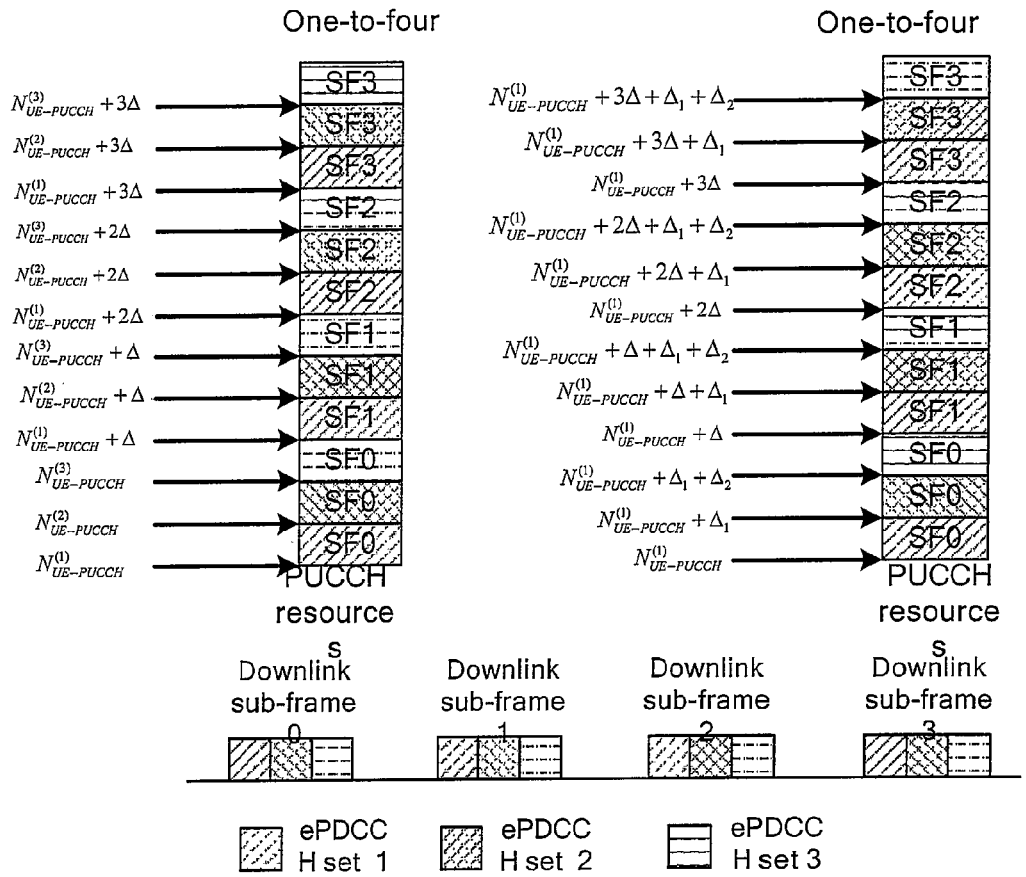
FIG. 4 illustrates a schematic diagram of allocation of physical uplink control channel resources according to alternative embodiments of the invention

FIG. 4 illustrates a schematic diagram of allocation of physical uplink control channel resources according to alternative embodiments of the invention.

In an embodiment illustrated on the left of FIG. 4, each ePDCCH set is configured with a second starting position $N_{UE-PUCCH}^{(k)}$ related to the ePDCCH set, where k=1, 2, 3 in this embodiment.

Particularly a base station signals the following information to a user equipment: the number L of ePDCCH sets per downlink sub-frame, the number of physical resource block pairs $N_1$ with $1 \leq l \leq L$ per ePDCCH set, the number of enhanced control channel elements $N_{eCCE}$ per physical resource block pair, an aggregation level $Q_l$ of downlink control information for scheduling the user equipment per ePDCCH set, and a second starting position $N_{UE-PUCCH}^{(k)}$ related to each ePDCCH set.

Correspondingly the user equipment indicates allocation of a PUCCH resource in an uplink sub-frame based upon the information signaled from the base station.

Particularly the user equipment determines the position, of ACK/NACK information for an HARQ, in a PUCCH as:

$$n_{PUCCH,m,k}^1 = \Delta \times m + n_{eCCE,m,k} + N_{UE-PUCCH}^{(k)},$$

Where in is the serial number of a downlink sub-frame including the downlink control information related to the user equipment, $N_{UE-PUCCH}^{(k)}$ is the second starting position from the base station, $n_{eCCE,m,k}$ is the lowest index of an enhanced control channel element occupied, by the downlink control information related to the user equipment, in the k-th ePDCCH set, including the downlink control information related to the user equipment, in the m-th downlink sub-frame, and $\Delta$ is a second offset, related to all the ePDCCH sets in a downlink sub-frame, calculated in the equation of:

$$\Delta = \sum_{l=1}^{L} \left\lfloor \frac{N_l \times N_{eCCE}}{Q_l} \right\rfloor,$$

L is the number of ePDCCH sets per downlink sub-frame, $N_1$ is the number of physical resource block pairs in the l-th ePDCCH set with $1 \leq l \leq L$, $N_{eCCE}$ is the number of enhanced control channel elements per physical resource block pair, and $Q_l$ is the aggregation level of the downlink control information for scheduling the user equipment in the l-th ePDCCH set. The aggregation level can be an average, or all the $Q_l$ can be set to 1, in which case it is not necessary for the base station to notify the use equipment of $Q_l$ information. The operator $\lfloor \ \rfloor$ represents rounding down or rounding up.

As illustrated on the left of FIG. 4, the user equipment determines a starting position of a PUCCH resource for ACK/NACK of the first ePDCCH set in the first downlink sub-frame SF0 as $N_{UE-PUCCH}^{(1)}$, a starting position of a PUCCH resource for ACK/NACK of the first ePDCCH set in the second downlink sub-frame SF1 as $N_{UE-PUCCH}^{(1)}+\Delta$, and a starting position of a PUCCH resource for ACK/NACK of the first ePDCCH set in the third downlink sub-frame SF2 as $N_{UE-PUCCH}^{(1)}+2\Delta$, where $\Delta$ corresponds to an offset of all the ePDCCH sets in a sub-frame.

In another embodiment of the invention, the second offset Δ can alternatively be calculated by the base station, and in this case it is not necessary for the base station to send the parameters required for calculation of Δ to the user equipment, that is, the number of ePDCCH sets L per downlink sub-frame, the number of physical resource block pairs $N_l$ per ePDCCH set with $1 \leq l \leq L$, the number of enhanced control channel elements $N_{eCCE}$ per physical resource block pair, and the aggregation level $Q_l$ of the downlink control information for scheduling the user equipment per ePDCCH set. The base station will simply send the calculated Δ to the user equipment so that the user equipment determines the position, of the ACK/NACK information for the HARQ, in the PUDCCH according to the received Δ.

As can be apparent on the left of FIG. 4, with this solution of the invention, an unnecessary waste can be avoided for the use of PUCCH resources.

Another embodiment of the invention is illustrated on the right of FIG. 4, and in this embodiment, a base station can determine a second starting position related to each ePDCCH set in the previous embodiment in the equation of:

$$N_{UE-PUCCH}^{(k)} = \sum_{l=1}^{k-1} \Delta_l + N_{UE-PUCCH}^{(1)},$$

Where $N_{UE-PUCCH}^{(k)}$ is the starting position related to the k-th ePDCCH set, $N_{UE-PUCCH}^{(1)}$ is the starting position related to the first ePDCCH set, $\Delta_l$ is an offset of the l-th ePDCCH set with $1 \leq l \leq L$, L being the number of ePDCCH sets per downlink sub-frame, where:

$$\Delta_l = \left\lfloor \frac{N_l \times N_{eCCE}}{Q_l} \right\rfloor,$$

Where $N_l$ is the number of physical resource block pairs in the l-th ePDCCH set with $1 \leq l \leq L$, $N_{eCCE}$ is the number of enhanced control channel elements per physical resource block pair, and $Q_l$ is an aggregation level of downlink control information for scheduling the user equipment in the l-th ePDCCH set.

In an embodiment where the user equipment calculates a second offset Δ, the base station has sent the foregoing parameters required for calculation of Δ to the user equipment, so it is not necessary for the base station to send the second starting position $N_{UE-PUCCH}^{(k)}$ related to each ePDCCH set to the user equipment, and the base station will simply send the starting position $N_{UE-PUCCH}^{(1)}$ related to the first ePDCCH set to the user equipment, so that the user equipment can calculate $N_{UE-PUCCH}^{(k)}$ in the foregoing equation according to the parameters required for calculation.

Also as can be apparent on the right of FIG. 4, with this solution of the invention, an unnecessary waste for the use of PUCCH resources can also be avoided.

In another embodiment of the invention, a base station can determine a third offset off dynamically according to a condition of scheduling, by the base station, of one or more user equipments in a plurality of downlink sub-frames. The base station can indicate this third offset via a specific information element in DCI, for example, the specific information element is an Auto Resource Indicator (ARI). In view of a small number of bits that can be carried in the DCI, an indicator of the third offset can be transmitted in the ARI information element instead of a particular value of the third offset, and a correspondence relationship between the indicator transmitted in the information element and the third offset can be prescribed in the base station side and the user equipment. For example, 00 indicating an actual offset of 8 and 01 indicating of an actual offset of 12 can be specified via radio resource control signaling. Particularly if the base station does not specify any correspondence relationship between the information element and the actual third offset via radio resource control signaling, then the user equipment may determine a PUCCH resource regardless of the third offset off.

Particularly in this embodiment, the base station sends the following information to the user equipment: a third starting position $N_{UE-PUCCH}^{(k)}$ related to each ePDCCH set and information indicating the third offset off, where the third starting position $N_{UE-PUCCH}^{(k)}$ is sent in radio resource control information, and the information indicating the third offset off is sent in downlink control information.

Correspondingly at the user equipment, for a scenario without one-to-one correspondence, that is, a scenario where one uplink sub-frame needs to provide ACK/NACK feedback resources corresponding to M downlink data sub-frames, in the k-th ePDCCH set of the m-th downlink sub-frame (that is, a downlink sub-frame numbered m), the user equipment detects its own DCI and a PDSCH resource, indicated by the DCI, for transmission of data, and also the user equipment obtains from the DCI the third offset off from which a PUCCH resource for feeding back ACK/NACK is determined (the user equipment determines the information indicating the third offset from the DCI and then determines the third offset corresponding to the indicating information). And the user equipment obtains the third starting position $N_{UE-PUCCH}^{(k)}$ corresponding to the ePDCCH set from the radio resource control signaling.

The user equipment determines the PUCCH resource for feeding back the ACK/NACK as follows:

$$n_{PUCCH,k}^1 = n_{eCCE,k} + N_{UE-PUCCH}^{(k)} + \text{off},$$

Where $n_{eCCE,k}$ is the lowest index of an enhanced control channel element, related to the downlink control information of the user equipment, in the k-th ePDCCH set (that is, the lowest index of the enhanced control channel element constituting the downlink control information), $N_{UE-PUCCH}^{(k)}$ is the third starting position from the base station, and off is the third offset.

In an embodiment of the invention, since DCI is present per downlink sub-frame, the information indicating the third offset will be available only in the scenario with one-to-one correspondence in order to lower an overhead of signaling. That is, the base station will have the information indicating the third offset carried in downlink control signaling only if one uplink sub-frame needs to provide ACK/NACK feedback resources corresponding to a plurality of downlink data sub-frames and will have the information indicating the third offset carried only if the user equipment is scheduled over ePDCCHs. In the scenario with one-to-one correspondence, the user equipment cannot determine a PUCCH resource according to the information indicating the third offset even if the information indicating the third offset is detected from the DCI.

With the use of DCI to indicate dynamically a PUCCH resource for feeding back ACK/NACK, the base station can determine per millisecond the number of PUCCH resources in a corresponding uplink sub-frame over which ACK/NACK needs to be fed back according to the number of currently scheduled UEs, which can further guarantee reasonable use of PUCCH resources and avoid a waste of resources.

In another embodiment of the invention, the base station determines a fourth starting position $N_{UE\text{-}PUCCH}^{(m,k)}$ related to each ePDCCH set per sub-frame and sends the fourth starting position to the user equipment via radio resource control signaling.

Particularly in an embodiment of the invention, the fourth starting position can be determined in the equation of:

$$N_{UE\text{-}PUCCH}^{(m,k)} = m \times N_{eCCE}^{k} + N_{UE\text{-}PUCCH}^{(k)} + \Delta_i,$$

Where $N_{UE\text{-}PUCCH}^{(m,k)}$ PUCCH is the starting position related to the k-th ePDCCH set in the m-th downlink sub-frame, $N_{eCCE}^{k}$ is the number of enhanced control channel elements in the k-th ePDCCH set with $1 \leq k \leq L$, and L being the number of ePDCCH sets per downlink sub-frame, $N_{UE\text{-}PUCCH}^{(k)}$ is the starting position related to the k-th ePDCCH set, and $\Delta_i$ is an offset related to a mapping relationship between the uplink sub-frame and the downlink sub-frames.

As such the foregoing embodiment is similar to the embodiment described in connection with FIG. 3 except that in the embodiment described in connection with FIG. 3, $N_{UE\text{-}PUCCH}^{(m,k)}$ is calculated by the user equipment, and in this embodiment, $N_{UE\text{-}PUCCH}^{(m,k)}$ is calculated and sent by the base station to the user equipment instead of being calculated by the user equipment to thereby lower a calculation overhead at the user equipment side.

Correspondingly at the user equipment side, if the user equipment detects in the k-th ePDCCH set of the m-th downlink sub-frame its own DCI and a PDSCH resource, indicated by the DCI, for transmission of data, then the user equipment determines a PUCCH resource for feeding back ACK/NACK as follows:

$$n_{PUCCH,m,k}^{1} = n_{eCCE,m,k} + N_{UE\text{-}PUCCH}^{(m,k)},$$

Where in is the serial number of a downlink sub-frame including the downlink control information related to the user equipment, $n_{eCCE,m,k}$ is the lowest index of an enhanced control channel element occupied, by the downlink control information related to the user equipment, in the k-th ePDCCH set, including the downlink control information related to the user equipment, in the m-th downlink sub-frame, and $N_{UE\text{-}PUCCH}^{(m,k)}$ is the fourth starting position from the base station.

This embodiment is similar to the embodiment described in connection with FIG. 3. A repeated description of an advantage thereof will be omitted here.

It shall be noted that the foregoing embodiments are merely illustrative but not to limit the invention. Any technical solutions without departing from the spirit of the invention shall fall into the scope of invention. Moreover any reference numerals in the claims shall not be construed as limiting the claims in question; the word "comprising" will not preclude another device(s) or step(s) which is (are) listed in the other claim(s) or the description; "a" or "an" preceding a device will not preclude the presence of a plurality of such a device; a function or functions of one or more of a plurality of devices included in an apparatus can be performed by the same device in hardware or software; and the terms "first", "second", "third", etc., are merely intended to designate a name but not to suggest any specific order.

The invention claimed is:

1. A method, in a base station of a wireless communication system, of assisting a user equipment in determining a position of acknowledgment/non-acknowledgment information for a hybrid automatic repeat request in a physical uplink control channel, wherein the user equipment sends in an uplink sub-frame the acknowledgment/non-acknowledgment information for one or more downlink sub-frames, and the method comprises:

determining a mapping relationship between the uplink sub-frame and the downlink sub-frame or sub-frames and the number of enhanced control channel elements ($N_{eCCE}^{k}$) per ePDCCH set;

determining a first starting position ($N_{UE\text{-}PUCCH}^{(k)}$) related to each ePDCCH set;

determining a first offset ($\Delta_i$) related to the determined mapping relationship between the uplink sub-frame and the downlink sub-frame or sub-frames; and sending the determined first starting position ($N_{UE\text{-}PUCCH}^{(k)}$) and first offset ($\Delta_i$) and information about the number of enhanced control channel elements ($N_{eCCE}^{k}$) per ePDCCH set to the user equipment.

2. The method according to claim 1, wherein the determining a mapping relationship further comprises:

determining an aggregation level ($Q_l$) of downlink control information for scheduling the user equipment per ePDCCH set; and the sending further comprises:

sending the aggregation level ($Q_l$) to the user equipment.

3. A method, in a user equipment of a wireless communication system, of determining a position of acknowledgment/non-acknowledgment information for a hybrid automatic repeat request, in a physical uplink control channel, wherein the user equipment sends in an uplink sub-frame the acknowledgment/non-acknowledgment information for one or more downlink sub-frames, and the method comprises:

receiving from a base station a first starting position ($N_{UE\text{-}PUCCH}^{(k)}$) related to each ePDCCH set, a first offset ($\Delta_i$) related to a mapping relationship between the uplink sub-frame and the downlink sub-frame or sub-frames and information about the number of enhanced control channel elements ($N_{eCCE}^{k}$, $1 \leq k \leq L$) per ePDCCH set;

determining a serial number (m) of a downlink sub-frame including downlink control information related to the user equipment;

determining a lowest index ($n_{eCCE,m,k}$) of an enhanced control channel element occupied, by the downlink control information related to the user equipment, in an ePDCCH set, including the downlink control information related to the user equipment, in the downlink sub-frame; and determining the position of the acknowledgment/non-acknowledgment information for the hybrid automatic repeat request in the physical uplink control channel as:

$$n_{PUCCH,m,k}^{1} = m \times N_{eCCE}^{k} + n_{eCCE,m,k} + N_{UE\text{-}PUCCH}^{(k)} + \Delta_i,$$

wherein m is the serial number of the downlink sub-frame including the downlink control information related to the user equipment, $N_{eCCE}^{k}$ is the number of enhanced control channel elements in the k-th ePDCCH set with $1 \leq k \leq L$ and L being the number of ePDCCH sets per downlink sub-frame, $N_{UE\text{-}PUCCH}^{(k)}$ is the first starting position from the base station, $\Delta_i$ is the first offset from the base station, and $n_{eCCE,m,k}$ is the lowest index of the enhanced control channel element occupied, by the downlink control information related to the user equipment, in the k-th ePDCCH set, including the downlink control information related to the user equipment, in the m-th downlink sub-frame.

4. The method according to claim 3, wherein the method further comprises:
   receiving from the base station an aggregation level ($Q_l$) of the downlink control information for scheduling the user equipment per ePDCCH set; and
   determining the position of the acknowledgment/non-acknowledgment information for the hybrid automatic repeat request in the physical uplink control channel according to the aggregation level ($Q_l$).

5. A method, in a base station of a wireless communication system, of assisting a user equipment in determining a position of acknowledgment/non-acknowledgment information for a hybrid automatic repeat request in a physical uplink control channel, wherein the user equipment sends in an uplink sub-frame the acknowledgment/non-acknowledgment information for one or more downlink sub-frames, and the method comprises:
   determining the number of ePDCCH sets (L) per downlink sub-frame, the number of physical resource block pairs per ePDCCH set ($N_l$, 1≤l≤L), the number of enhanced control channel elements ($N_{eCCE}$) per physical resource block pair, and an aggregation level ($Q_l$) of downlink control information for scheduling the user equipment per ePDCCH set;
   determining a second starting position ($N_{UE-PUCCH}^{(k)}$) related to each ePDCCH set; and
   sending to the user equipment the determined second starting position ($N_{UE-PUCCH}^{(k)}$) the determined number (L) of ePDCCH sets per downlink sub-frame, the number of physical resource block pairs ($N_l$, 1≤l≤L) per ePDCCH set, the number of enhanced control channel elements ($N_{eCCE}$) per physical resource block pair, and the aggregation level ($Q_l$) of the downlink control information for scheduling the user equipment per ePDCCH set.

6. The method according to claim 5, wherein the second starting position related to each ePDCCH set is determined in the equation of:

$$N_{UE-PUCCH}^{(k)} = \sum_{l=1}^{k-1} \Delta_l + N_{UE-PUCCH}^{(1)},$$

wherein $N_{UE-PUCCH}^{(k)}$ is the starting position related to the k-th ePDCCH set, $N_{UE-PUCCH}^{(l)}$ is the starting position related to the first ePDCCH set, and $\Delta_l$ is an offset of the l-th ePDCCH set with 1≤l≤L, L being the number of ePDCCH sets per downlink sub-frame and $$\Delta_l = \left\lfloor \frac{N_l \times N_{eCCE}}{Q_l} \right\rfloor.$$

7. A method, in a user equipment of a wireless communication system, of determining a position of acknowledgment/non-acknowledgment information for a hybrid automatic repeat request in a physical uplink control channel, wherein the user equipment sends in an uplink sub-frame the acknowledgment/non-acknowledgment information for one or more downlink sub-frames, and the method comprises:
   receiving from a base station a second starting position ($N_{UE-PUCCH}^{(k)}$) related to each ePDCCH set, the number of ePDCCH sets (L) per downlink sub-frame, the number of physical resource block pairs ($N_l$, 1≤l≤L) per ePDCCH set, the number of enhanced control channel elements ($N_{eCCE}$) per physical resource block pair, and an aggregation level ($Q_l$) of downlink control information for scheduling the user equipment per ePDCCH set;
   calculating a second offset related to all the ePDCCH sets in a downlink sub-frame in the equation of:

$$\Delta = \sum_{l=1}^{L} \left\lfloor \frac{N_l \times N_{eCCE}}{Q_l} \right\rfloor,$$

wherein L is the number of ePDCCH sets per downlink sub-frame, $N_l$ is the number of physical resource block pairs in the l-th ePDCCH set with 1≤l≤L, $N_{eCCE}$ is the number of enhanced control channel elements per physical resource block pair, and $Q_l$ is the aggregation level of the downlink control information for scheduling the user equipment in the l-th ePDCCH set;
   determining a serial number (m) of a downlink sub-frame including the downlink control information related to the user equipment;
   determining a lowest index ($n_{eCCE,m,k}$) of an enhanced control channel element occupied, by the downlink control information related to the user equipment, in an ePDCCH set, including the downlink control information related to the user equipment, in the downlink sub-frame; and
   determining the position of the acknowledgment/non-acknowledgment information for the hybrid automatic repeat request in the physical uplink control channel as:

$$n_{PUCCH,m,k} = \Delta \times m + n_{eCCE,m,k} + N_{UE-PUCCH}^{(k)},$$

wherein m is the serial number of the downlink sub-frame including the downlink control information related to the user equipment, $N_{UE-PUCCH}^{(k)}$ is the second starting position from the base station, $\Delta$ is the calculated second offset, and $n_{eCCE,m,k}$ is the lowest index of the enhanced control channel element occupied, by the downlink control information related to the user equipment, in the k-th ePDCCH set, including the downlink control information related to the user equipment, in the m-th downlink sub-frame.

8. A method, in a base station of a wireless communication system, of assisting a user equipment in determining a position of acknowledgment/non-acknowledgment information for a hybrid automatic repeat request in a physical uplink control channel, wherein the user equipment sends in an uplink sub-frame the acknowledgment/non-acknowledgment information for one or more downlink sub-frames, and the method comprises:
   determining the number of ePDCCH sets (L) per downlink sub-frame, the number of physical resource block pairs per ePDCCH set ($N_l$, 1≤l≤L), the number of enhanced control channel elements ($N_{eCCE}$) per physical resource block pair, and an aggregation level ($Q_l$) of downlink control information for scheduling the user equipment per ePDCCH set;
   determining a second starting position ($N_{UE-PUCCH}^{(k)}$) related to each ePDCCH set;
   determining a second offset ($\Delta$) related to all the ePDCCH sets in a downlink sub-frame:

$$\Delta = \sum_{l=1}^{L} \left\lfloor \frac{N_l \times N_{eCCE}}{Q_l} \right\rfloor,$$

wherein L is the number of ePDCCH sets per downlink sub-frame, $N_l$ is the number of physical resource block pairs in the l-th ePDCCH set with $1 \leq l \leq L$, $N_{eCCE}$ is the number of enhanced control channel elements per physical resource block pair, and $Q_l$ is the aggregation level of the downlink control information for scheduling the user equipment related to the l-th ePDCCH set; and sending the determined second starting position ($N_{UE-PUCCH}^{(k)}$) and second offset ($\Delta$) to the user equipment.

9. A method, in a user equipment of a wireless communication system, of determining a position of acknowledgment/non-acknowledgment information for a hybrid automatic repeat request in a physical uplink control channel, wherein the user equipment sends in an uplink sub-frame the acknowledgment/non-acknowledgment information for one or more downlink sub-frames, and the method comprises:

receiving a second starting position ($N_{UE-PUCCH}^{(k)}$) related to each ePDCCH set and a second offset ($\Delta$) related to all the ePDCCH sets in a downlink sub-frame from a base station, wherein the second offset ($\Delta$) is determined in the equation of:

$$\Delta = \sum_{l=1}^{L} \left\lfloor \frac{N_l \times N_{eCCE}}{Q_l} \right\rfloor,$$

wherein L is the number of ePDCCH sets per downlink sub-frame, $N_l$ is the number of physical resource block pairs in the l-th ePDCCH set with $1 \leq l \leq L$, $N_{eCCE}$ is the number of enhanced control channel elements per physical resource block pair, and $Q_l$ is an aggregation level of downlink control information for scheduling the user equipment in the l-th ePDCCH set;

determining a serial number (m) of a downlink sub-frame including the downlink control information related to the user equipment;

determining a lowest index ($n_{eCCE,m,k}$) of an enhanced control channel element occupied, by the downlink control information related to the user equipment, in an ePDCCH set, including the downlink control information related to the user equipment, in the downlink sub-frame; and determining the position of the acknowledgment/non-acknowledgment information for the hybrid automatic repeat request in the physical uplink control channel as:

$$n_{PUCCH,m,k}^1 = \Delta \times m + n_{eCCE,m,k} + N_{UE-PUCCH}^{(k)},$$

wherein m is the serial number of the downlink sub-frame including the downlink control information related to the user equipment, $N_{UE-PUCCH}^{(k)}$ is the second starting position from the base station, $\Delta$ is the second offset from the base station, and $n_{eCCE,m,k}$ is the lowest index of the enhanced control channel element occupied, by the downlink control information related to the user equipment, in the k-th ePDCCH set, including the downlink control information related to the user equipment, in the m-th downlink sub-frame.

10. A method, in a base station of a wireless communication system, of assisting a user equipment in determining a position of acknowledgment/non-acknowledgment information for a hybrid automatic repeat request in a physical uplink control channel, wherein the user equipment sends in an uplink sub-frame the acknowledgment/non-acknowledgment information for one or more downlink sub-frames, and the method comprises:

determining a third starting position ($N_{UE-PUCCH}^{(k)}$) related to each ePDCCH set;

determining a third offset (off) dynamically according to a condition of scheduling, by the base station, of one or more user equipments in a plurality of downlink sub-frames; and sending the third starting position ($N_{UE-PUCCH}^{(k)}$) and information indicating the third offset (off) to the user equipment, wherein the third starting position ($N_{UE-PUCCH}^{(k)}$) is sent in radio resource control information, and the information indicating the third offset (off) is sent in downlink control information.

11. A method, in a user equipment of a wireless communication system, of determining a position of acknowledgment/non-acknowledgment information for a hybrid automatic repeat request in a physical uplink control channel, wherein the user equipment sends in an uplink sub-frame the acknowledgment/non-acknowledgment information for one or more downlink sub-frames, and the method comprises:

receiving from a base station a third starting position ($N_{UE-PUCCH}^{(k)}$) related to each ePDCCH set, included in radio resource control information; and receiving from the base station information, indicating a third offset (off), included in downlink control information in an ePDCCH set of a downlink sub-frame, wherein the third offset (off) is an offset determined dynamically by the base station for the user equipment according to a condition of scheduling of one or more user equipments in a plurality of downlink sub-frames;

determining a lowest index ($n_{eCCE,k}$) of an enhanced control channel element, related to the downlink control information of the user equipment, in the ePDCCH set including the information indicating the third offset (off); and determining the position of the acknowledgment/non-acknowledgment information for the hybrid automatic repeat request in the physical uplink control channel as:

$$n_{PUCCH,k}^1 + n_{eCCE,k} + N_{UE-PUCCH}^{(k)} + \text{off},$$

wherein $n_{eCCE,k}$ is the lowest index of the enhanced control channel element, related to the downlink control information of the user equipment, in the k-th ePDCCH set, $N_{UE-PUCCH}^{(k)}$ is the third starting position from the base station, and off is the third offset.

12. A method, in a base station of a wireless communication system, of assisting a user equipment in determining a position of acknowledgment/non-acknowledgment information for a hybrid automatic repeat request in a physical uplink control channel, wherein the user equipment sends in an uplink sub-frame the acknowledgment/non-acknowledgment information for one or more downlink sub-frames, and the method comprises:

determining a fourth starting position ($N_{UE-PUCCH}^{(m,k)}$) related to each ePDCCH set per sub-frame; and sending the determined fourth starting position ($N_{UE-PUCCH}^{(m,k)}$) to the user equipment; and wherein the fourth starting position is determined as:

$$N_{UE-PUCCH}^{(m,k)} = m \times N_{eCCE}^k + N_{UE-PUCCH}^{(k)} + \Delta_i,$$

wherein $N_{UE-PUCCH}^{(m,k)}$ is the starting position related to the k-th ePDCCH set in the m-th downlink sub-frame, $N_{eCCE}^k$ is the number of enhanced control channel elements in the k-th ePDCCH set with and $1 \leq k \leq L$ being the number of ePDCCH sets per downlink sub-frame, $N_{UE-PUCCH}^{(k)}$ is the starting position related to the k-th ePDCCH set, and $\Delta_i$ is an offset related to a mapping relationship between the uplink sub-frame and the downlink sub-frame or sub-frames.

13. A method, in a user equipment of a wireless communication system, of determining a position of acknowledgment/non-acknowledgment information for a hybrid automatic repeat request in a physical uplink control channel, wherein the user equipment sends in an uplink sub-frame the acknowledgment/non-acknowledgment information for one or more downlink sub-frames, and the method comprises:

receiving from a base station a fourth starting position ($N_{UE\text{-}PUCCH}^{(m,k)}$) related to each ePDCCH set per sub-frame;

determining a serial number (m) of a downlink sub-frame including downlink control information related to the user equipment;

determining a lowest index ($n_{eCCE,m,k}$) of an enhanced control channel element, occupied by the downlink control information related to the user equipment, in an ePDCCH set, including the downlink control information related to the user equipment, in the downlink sub-frame; and determining the position of the acknowledgment/non-acknowledgment information for the hybrid automatic repeat request in the physical uplink control channel as:

$$n_{PUCCH,m,k}^{1} = n_{eCCE,m,k} + N_{UE\text{-}PUCCH}^{(m,k)},$$

wherein m is the serial number of the downlink sub-frame including the downlink control information related to the user equipment, $n_{eCCE,m,k}$ is the lowest index of the enhanced control channel element occupied, by the downlink control information related to the user equipment, in the k-th ePDCCH set, including the downlink control information related to the user equipment, in the m-th downlink sub-frame, and $N_{UE\text{-}PUCCH}^{(m,k)}$ is the fourth starting position from the base station.

* * * * *